US011078994B2

(12) United States Patent
Honda et al.

(10) Patent No.: US 11,078,994 B2
(45) Date of Patent: Aug. 3, 2021

(54) AUTO-TENSIONER

(71) Applicant: NTN CORPORATION, Osaka (JP)

(72) Inventors: Naoto Honda, Shizuoka (JP); Tadahisa Tanaka, Shizuoka (JP)

(73) Assignee: NTN CORPORATION, Osaka (JP)

(*) Notice: Subject to any disclaimer, the term of this patent is extended or adjusted under 35 U.S.C. 154(b) by 324 days.

(21) Appl. No.: 16/300,144

(22) PCT Filed: May 11, 2017

(86) PCT No.: PCT/JP2017/017911
§ 371 (c)(1),
(2) Date: Nov. 9, 2018

(87) PCT Pub. No.: WO2017/195867
PCT Pub. Date: Nov. 16, 2017

(65) Prior Publication Data
US 2019/0154119 A1    May 23, 2019

(30) Foreign Application Priority Data

May 13, 2016    (JP) .............................. JP2016-097070

(51) Int. Cl.
*F16H 7/12* (2006.01)
*F02B 67/06* (2006.01)
(Continued)

(52) U.S. Cl.
CPC .......... *F16H 7/1236* (2013.01); *F02B 67/06* (2013.01); *F16B 2/22* (2013.01); *F16B 2/24* (2013.01);
(Continued)

(58) Field of Classification Search
CPC ..... F16H 2007/0878; F16H 2007/0806; F16H 7/1281; F16H 2007/0893
(Continued)

(56) References Cited

U.S. PATENT DOCUMENTS 4,743,224 A * 5/1988 Yoshikawa ........... F16H 7/1281
                                                        474/101
4,764,157 A * 8/1988 Brandenstein ........ F16H 7/1281
                                                        474/11
(Continued)

FOREIGN PATENT DOCUMENTS

JP      10-306859      11/1998
JP      2008-051218    3/2008
(Continued)

OTHER PUBLICATIONS

International Search Report dated Jun. 13, 2017 in International (PCT) Application No. PCT/JP2017/017911.
(Continued)

*Primary Examiner* — Henry Y Liu
(74) *Attorney, Agent, or Firm* — Wenderoth, Lind & Ponack, L.L.P.

(57) ABSTRACT

A fixing tool of an auto-tensioner includes inwardly inclined engaging pieces inclined inwardly so as to be opposed to respective tapered surfaces of a spring seat and a cylinder of the auto-tensioner. The engaging pieces have concave surfaces that contact the tapered surfaces over a circumferentially extending area. This minimizes the deformation of the engaging pieces such that the diametrical distances therebetween increase due to contact with the tapered surfaces when sandwiching the spring seat and the cylinder with the engaging pieces from the axially opposite directions, thereby preventing the fixing tool from coming off.

4 Claims, 11 Drawing Sheets

(51) Int. Cl.
*F16B 2/24* (2006.01)
*F16H 7/08* (2006.01)
*F16B 2/22* (2006.01)

(52) U.S. Cl.
CPC ............. *F16H 7/08* (2013.01); *F16H 7/0836* (2013.01); *F16H 7/0848* (2013.01); *F16H 7/12* (2013.01); *F16H 2007/0812* (2013.01); *F16H 2007/0859* (2013.01); *F16H 2007/0865* (2013.01); *F16H 2007/0878* (2013.01); *F16H 2007/0893* (2013.01)

(58) Field of Classification Search
USPC .................................................. 474/110, 109
See application file for complete search history.

(56) References Cited

U.S. PATENT DOCUMENTS

| | | | | |
|---|---|---|---|---|
| 4,832,665 A * | 5/1989 | Kadota | ................ | F16H 7/1227 474/112 |
| 4,983,144 A * | 1/1991 | Ojima | ................ | F16F 1/04 267/106 |
| 5,004,448 A * | 4/1991 | Ojima | ................ | F16F 3/04 188/166 |
| 5,004,449 A * | 4/1991 | Ojima | ................ | F16H 7/08 222/546 |
| 5,033,992 A * | 7/1991 | Ojima | ................ | F16H 7/08 474/111 |
| 5,035,680 A * | 7/1991 | Ojima | ................ | F16H 7/08 474/138 |
| 5,037,357 A * | 8/1991 | Ojima | ................ | F16H 7/08 474/111 |
| 5,073,158 A * | 12/1991 | Ojima | ................ | F16H 7/08 474/138 |
| 5,518,459 A * | 5/1996 | Sakai | ................ | F16H 7/1227 474/133 |
| 5,632,698 A * | 5/1997 | Suzuki | ................ | F16F 9/3207 474/110 |
| 5,676,614 A * | 10/1997 | Inoue | ................ | F16H 7/08 474/110 |
| 5,931,754 A * | 8/1999 | Stief | ................ | F16H 7/0848 474/109 |
| 5,989,139 A | 11/1999 | Dusinberre, II et al. | | |
| 6,120,402 A * | 9/2000 | Preston | ................ | F16H 7/08 474/109 |
| 6,159,120 A * | 12/2000 | Rointru | ................ | F16H 7/08 474/110 |
| 6,244,981 B1 * | 6/2001 | Simpson | ................ | F16H 7/0848 474/110 |
| 6,422,964 B1 * | 7/2002 | Rointru | ................ | F16H 7/1218 474/133 |
| 6,602,154 B1 * | 8/2003 | Guichard | ................ | F16H 7/08 474/101 |
| 6,659,896 B1 * | 12/2003 | Stief | ................ | F16H 7/1281 474/112 |
| 6,953,406 B2 * | 10/2005 | Kurokawa | ................ | F16H 7/0848 474/109 |
| 8,038,556 B2 * | 10/2011 | Schmidl | ................ | F16H 7/1281 474/135 |
| 8,419,576 B2 * | 4/2013 | Sauermann | ................ | F16H 7/1281 474/135 |
| 2003/0017893 A1 * | 1/2003 | Kaido | ................ | F16H 7/08 474/101 |
| 2003/0017894 A1 * | 1/2003 | Kaiser | ................ | F16H 7/1218 474/112 |
| 2003/0125142 A1 * | 7/2003 | Hashimoto | ................ | F16H 7/24 474/109 |
| 2004/0092350 A1 * | 5/2004 | Hashimoto | ................ | F16H 7/0848 474/110 |
| 2004/0180745 A1 * | 9/2004 | Dinca | ................ | F16H 7/1281 474/135 |
| 2005/0130777 A1 * | 6/2005 | Grunau | ................ | F16H 7/0848 474/110 |
| 2006/0046882 A1 * | 3/2006 | Assel | ................ | F16H 7/08 474/111 |
| 2006/0084537 A1 * | 4/2006 | Matsushita | ................ | F16H 7/0836 474/109 |
| 2006/0229151 A1 * | 10/2006 | Jansen | ................ | F16H 7/1281 474/117 |
| 2006/0270500 A1 * | 11/2006 | Yamamoto | ................ | F16H 7/0836 474/109 |
| 2007/0099736 A1 * | 5/2007 | Hallen | ................ | F16H 7/129 474/101 |
| 2007/0161444 A1 * | 7/2007 | Hartmann | ................ | F16H 7/1272 474/133 |
| 2008/0153644 A1 * | 6/2008 | Arneth | ................ | F16H 7/1281 474/135 |
| 2008/0207367 A1 * | 8/2008 | Bogner | ................ | F16H 7/1281 474/133 |
| 2009/0215563 A1 * | 8/2009 | Sauermann | ................ | F16H 7/1281 474/135 |
| 2009/0215564 A1 * | 8/2009 | Pflug | ................ | F16H 7/1281 474/135 |
| 2009/0286637 A1 * | 11/2009 | Stief | ................ | F16H 7/1281 474/135 |
| 2010/0022338 A1 * | 1/2010 | Botez | ................ | F16H 7/08 474/111 |
| 2010/0022340 A1 * | 1/2010 | Schmidl | ................ | F16H 7/1281 474/135 |
| 2010/0035712 A1 * | 2/2010 | Hartmann | ................ | F16H 7/1281 474/110 |
| 2010/0222167 A1 * | 9/2010 | Chekansky | ................ | F16H 7/0836 474/110 |
| 2010/0273591 A1 * | 10/2010 | Graf | ................ | F16H 7/08 474/138 |
| 2011/0028253 A1 * | 2/2011 | Perissinotto | ................ | F16H 7/0848 474/135 |
| 2011/0207567 A1 * | 8/2011 | Kaiser | ................ | F16H 7/0836 474/110 |
| 2011/0312454 A1 * | 12/2011 | Comsa | ................ | F01L 1/024 474/110 |
| 2012/0040790 A1 * | 2/2012 | Perissinotto | ................ | F16H 7/08 474/110 |
| 2013/0190117 A1 * | 7/2013 | Bauer | ................ | F16H 7/08 474/111 |
| 2013/0274045 A1 * | 10/2013 | Yoshida | ................ | F16H 7/0848 474/101 |
| 2014/0057748 A1 | 2/2014 | Satomura et al. | | |
| 2014/0113755 A1 * | 4/2014 | Ward | ................ | F16H 7/1281 474/112 |
| 2014/0248983 A1 * | 9/2014 | Ishikawa | ................ | F16H 7/18 474/140 |
| 2014/0315673 A1 * | 10/2014 | Zacker | ................ | F16H 7/1218 474/135 |
| 2014/0342862 A1 * | 11/2014 | Wolf | ................ | F16H 7/1218 474/117 |
| 2015/0005120 A1 * | 1/2015 | Kurematsu | ................ | F16H 7/08 474/111 |
| 2015/0247558 A1 * | 9/2015 | Hamers | ................ | F16H 7/1218 474/117 |
| 2015/0337927 A1 * | 11/2015 | Benz | ................ | F16H 7/12 474/133 |
| 2015/0345596 A1 * | 12/2015 | Lindner | ................ | F01L 1/022 474/111 |
| 2015/0345597 A1 * | 12/2015 | Walter | ................ | F02B 67/06 474/134 |
| 2015/0354675 A1 * | 12/2015 | Hao | ................ | H05F 3/00 474/90 |
| 2015/0369346 A1 * | 12/2015 | Sisodia | ................ | F16H 7/14 474/135 |
| 2016/0252167 A1 * | 9/2016 | Guyot | ................ | F16H 7/08 474/111 |
| 2016/0273623 A1 * | 9/2016 | Spicer | ................ | F16H 7/1245 |
| 2017/0045120 A1 * | 2/2017 | Yokoyama | ................ | F16H 7/0829 |
| 2017/0146100 A1 * | 5/2017 | Walter | ................ | F02B 67/06 |
| 2017/0219068 A1 * | 8/2017 | Tronquoy | ................ | F16H 7/1281 |
| 2017/0255222 A1 * | 9/2017 | Ullein | ................ | F16H 7/08 |
| 2017/0363181 A1 * | 12/2017 | Freemantle | ................ | F16H 7/0848 |

(56) References Cited

U.S. PATENT DOCUMENTS

2017/0370447 A1* 12/2017 Freemantle ........... F16H 7/0848
2018/0135732 A1* 5/2018 Hartmann ............. F16H 7/1218
2019/0113112 A1* 4/2019 Schug ...................... F16H 7/08

FOREIGN PATENT DOCUMENTS

| JP | 2010-249273 | 11/2010 |
| JP | 2012-225447 | 11/2012 |
| JP | 2013-068277 | 4/2013 |
| WO | 2015/115555 | 8/2015 |

OTHER PUBLICATIONS

International Preliminary Report on Patentability dated Nov. 13, 2018 in International (PCT) Application No. PCT/JP2017/017911.
Extended European Search Report dated Mar. 29, 2019 in European Patent Application No. 17796225.5.

* cited by examiner

AUTO-TENSIONER

TECHNICAL FIELD

The present invention relates to an auto-tensioner used to maintain the tension of an engine accessory driving belt for driving automotive engine accessories such as an alternator.

BACKGROUND ART

Automotive engine accessories, such as an alternator, an air-conditioner, and a water pump, have their respective rotary shafts coupled to an engine crankshaft by an engine accessory driving belt, and are driven by the engine through the engine accessory driving belt. In order to keep the tension of the engine accessory driving belt within a proper range, a tension adjusting device is used which comprises pulley arm pivotable about a support shaft, a tension pulley rotatably mounted on the pulley arm, and an auto-tensioner that biases the pulley arm in a direction in which the tension pulley is pressed against the engine accessory driving belt.

Among conventional auto-tensioners used in such a tension adjusting device, a hydraulic auto-tensioner is known that includes a cylinder having a closed end, a rod axially movably inserted in the cylinder, a hydraulic damper mechanism for dampening the pushing force applied to the rod, a spring seat fixed to the end of the rod protruding out of the cylinder, and a return spring biasing, through the spring seat, the rod in the direction in which the rod protrudes out of the cylinder. The spring seat includes a flange supporting the return spring, and a coupling piece protruding from the flange in the axial direction of the rod. The cylinder includes another coupling piece axially protruding from its closed end. (Such a hydraulic auto-tensioner is disclosed e.g., in JP H10-306859A and JP 2012-225447A).

This hydraulic auto-tensioner is used by coupling the coupling piece of the cylinder to the pulley arm, and coupling the coupling piece of the spring seat to the engine so that, when the tension of the engine accessory driving belt fluctuates, the rod moves to a position where the tension of the engine accessory driving belt balances with the biasing force of the return spring, thereby absorbing the tension fluctuations of the engine accessory driving belt. Also, the hydraulic damper mechanism dampens the pushing force applied to the rod from the engine accessory driving belt, thereby stabilizing the tension of the engine accessory driving belt.

In assembling the engine, with the engine accessories and the auto-tensioner mounted to the engine beforehand, the engine accessory driving belt is trained around the pulleys for driving the respective engine accessories, the crank pulley, and the tension pulley. If the auto-tensioner is in the extended position under the biasing force of the return spring, the engine accessory driving belt cannot be trained around these pulleys because it cannot be stretched unlimitedly.

Thus, in order to train the engine accessory driving belt around the above-mentioned pulleys, this has to be done with the auto-tensioner kept in the contracted position by keeping the rod fully pushed into the cylinder against the biasing force of the return spring. It is difficult to train the engine accessory driving belt around the pulleys with the auto-tensioner kept in the contracted position. Thus, it is preferable to use some means capable of keeping the rod fully retracted in the cylinder, and preventing the rod from protruding out of the cylinder from the retracted position so that the engine accessory driving belt can be fitted in position more easily.

The auto-tensioners disclosed in JP H10-306859A and JP 2012-225447A each use such means, which comprises a fixing tool configured to be fitted to the outside of the cylinder and the spring seat so as to keep the rod pushed into the cylinder.

The fixing tool of JP H10-306859A comprises a one-piece integral metal member including a pair side portions defining a partial circumferential opening therebetween, and arranged so as to sandwich the cylinder and the spring seat in a diametrical direction. A connecting portion circumferentially connects the pair of side portions together at a position opposite from the partial circumferential opening. Each side portion includes a pair of engaging pieces configured to sandwich the cylinder and the spring seat from the axially opposite directions with the cylinder and the spring seat inserted into the fixing tool through the partial circumferential opening. Each engaging piece is radially bent at a position axially protruding beyond the connecting portion. The flange of the spring seat and the closed end of the cylinder have radial flat surfaces around the coupling pieces of the spring seat and the cylinder, respectively. The flat surface of the flange and the flat surface of the cylinder are axially opposed to each other. The radially bent portion of each engaging piece has a flat surface configured to be brought into contact with one of the flat surfaces of the flange and the cylinder. The fixing tool is thus capable of rigidly holding the spring seat and the cylinder in the position where the rod is fully pushed into the cylinder.

JP 2012-225447A discloses an annular fixing tool configured to be wrapped around the spring seat and the cylinder so as to be brought into contact with the coupling piece of the spring seat and the coupling piece of the cylinder from outside and such that cutting tool insertion spaces are defined between the cutting tool and the respective coupling pieces. Thus, the annular fixing tool can be removed by inserting a cutting tool into one of the cutting tool insertion spaces and cutting the fixing tool, without the need to further contract the auto-tensioner.

One problem with the fixing tool of JP H10-306859A is that it cannot stably and rigidly hold an auto-tensioner as disclosed in JP 2012-225447A in the contracted position. In particular, the auto-tensioner of JP 2012-225447A has a tapered surface on the spring seat whose diameter axially decreases toward the coupling piece of the spring seat, and has a tapered surface on the cylinder whose diameter axially decreases toward the coupling piece of the cylinder. The tapered surfaces, which are provided to reduce the cost and weight of the auto-tensioner, extend to areas close to the respective coupling pieces. Now suppose that the fixing tool of JP H10-306859A is used for an auto-tensioner including a spring seat and a cylinder having tapered surfaces as described above. In this case, the engaging pieces are brought into contact with the respective tapered surfaces to sandwich the spring seat and the cylinder from the axially opposite directions. For this purpose, it is necessary to inwardly incline the engaging pieces so as to extend along the corresponding tapered surfaces. This means that the flat surfaces of the engaging pieces sandwiching each tapered surface on diametrically opposite sides thereof are brought into line contact with the tapered surface on the diametrically opposite sides of the tapered surface. Thus, if the load of the spring disposed between the flange of the spring seat and the closed end of the cylinder is large, when the axial spring load is applied to the respective coupling pieces of the spring seat and the cylinder, due to a wedge effect in which the diametrical component forces of the axial spring load at the contact portions between the respective tapered surfaces and the corresponding engaging pieces push the engaging pieces outwardly, the diametrical distances between the engaging pieces on the diametrically opposite sides of the respective tapered surfaces could increase to such an extent that the fixing tool comes off.

On the other hand, since the fixing tool of JP 2012-225447A is wrapped around the coupling piece of the spring seat and the coupling piece of the cylinder, it can stably hold the auto-tensioner even if the spring seat and the cylinder have tapered surfaces as described above. However, such a fixing tool cannot be used if a cutting tool for cutting the fixing tool cannot be used.

An object of the present invention is to minimize the deformation of the engaging pieces of the fixing tool of the auto-tensioner such that the diametrical distances between the engaging pieces on the diametrically opposite sides of the respective tapered surfaces of the cylinder and the spring seat increase when the engaging pieces sandwich the spring seat and the cylinder from the axially opposite direction, thereby preventing the fixing tool from coming off.

SUMMARY OF THE INVENTION

In order to achieve this object, the present invention firstly provides an auto-tensioner comprising: a cylinder having a closed end; a rod axially movably inserted in the cylinder and having a protruding end protruding beyond the cylinder; a hydraulic damper mechanism configured to dampen a pushing force applied to the rod; a spring seat fixed to the protruding end of the rod; a return spring configured to bias, through the spring seat, the rod in a direction in which the rod protrudes out of the cylinder; and a fixing tool configured to be fitted to outside of the cylinder and the spring seat so as to keep the rod pushed into the cylinder. The spring seat includes a flange supporting the return spring, and a coupling piece axially protruding from the flange, and the cylinder includes a coupling piece axially protruding from the closed end of the cylinder. At least one of the spring seat and the cylinder has a tapered surface having a diameter which decreases axially toward the coupling piece of the at least one of the spring seat and the cylinder. The fixing tool includes: a pair of side portions defining a partial circumferential opening therebetween, and arranged so as to sandwich the cylinder and the spring seat in a diametrical direction; and a connecting portion circumferentially connecting the pair of side portions together at a position opposite from the partial circumferential opening. Each of the pair of side portions includes a first engaging piece and a second engaging piece that are configured to sandwich the cylinder and the spring seat from axially opposite directions with the first engaging piece opposed to the tapered surface, the first engaging piece being inclined inwardly and having a concave surface configured to contact the tapered surface over a circumferentially extending area.

With this first arrangement, since the first engaging pieces, which are configured to be opposed to the tapered surface, come into contact with the tapered surface over a circumferentially extending area, the wedge effect is weak, so that the first engaging pieces are less likely to be deformed such that the diametrical distance therebetween increases. This in turn makes it more difficult for the fixing tool to come off. Also, any force that tends to move the fixing tool will result in the concave surface of each first engaging piece engaging one of the ends of the portion of the tapered surface that is located inside of the concave surface, thus making the fixing tool even less likely to come off. Thus, with this arrangement, the first engaging pieces, which contact the tapered surface of the at least one of the cylinder and the spring seat, are less likely to be deformed such that the diametrical distance therebetween increases. This prevents the fixing tool from coming off.

In this first arrangement, preferably, the fixing tool further includes a reinforcing portion connecting together the first engaging pieces of the respective pair of side portions.

The reinforcing portion resists the wedge effect on the first engaging pieces, thereby preventing the first engaging pieces from being deformed such that the diametrical distance therebetween increases. Thus, the reinforcing portion more effectively prevents the first engaging pieces from being deformed such that the diametrical distance therebetween increases.

Also in this first arrangement, each of the cylinder and the spring seat may have the tapered surface, and the second engaging piece of each of the side portions may have the concave surface.

In this first arrangement, the first engaging pieces of the respective side portions may be configured to be opposed to the tapered surface of one of the cylinder and the spring seat, the second engaging pieces of the respective side portions may be configured to be opposed to the tapered surface of the other of the cylinder and the spring seat, and the fixing tool may further include a reinforcing portion connecting the second engaging pieces together.

As a second arrangement, the present invention provides an auto-tensioner comprising: a cylinder having a closed end; a rod axially movably inserted in the cylinder and having a protruding end protruding beyond the cylinder; a hydraulic damper mechanism configured to dampen a pushing force applied to the rod; a spring seat fixed to the protruding end of the rod; a return spring configured to bias, through the spring seat, the rod in a direction in which the rod protrudes out of the cylinder; and a fixing tool configured to be fitted to outside of the cylinder and the spring seat so as to keep the rod pushed into the cylinder. The spring seat includes a flange supporting the return spring, and a coupling piece axially protruding from the flange, and the cylinder includes a coupling piece axially protruding from the closed end of the cylinder. At least one of the spring seat and the cylinder has a tapered surface having a diameter which decreases axially toward the coupling piece of the at least one of the spring seat and the cylinder. The fixing tool includes: a pair of side portions defining a partial circumferential opening therebetween, and arranged so as to sandwich the cylinder and the spring seat in a diametrical direction; and a connecting portion circumferentially connecting the pair of side portions together at a position opposite from the partial circumferential opening. Each of the pair of side portions includes a first engaging piece and a second engaging piece that are configured to sandwich the cylinder and the spring seat from axially opposite directions with the first engaging piece opposed to the tapered surface, the first engaging piece being inclined inwardly; and a reinforcing portion connecting together the first engaging pieces of the respective pair of side portions.

With this second arrangement, the reinforcing portion resists the wedge effect on the first engaging pieces, thereby preventing the first engaging pieces from being deformed such that the diametrical distance therebetween increases. Thus, the reinforcing portion prevents the first engaging pieces from being deformed such that the diametrical distance therebetween increase, thereby preventing the fixing tool from coming off.

In the second arrangement, preferably, each first engaging piece includes an inwardly bent end portion located close to the partial circumferential opening, and configured to contact the tapered surface.

The inwardly bent end portion of each first engaging piece allows the first engaging piece to contact the tapered surface at a plurality of circumferentially spaced apart portions or a circumferentially continuous portion in the area of the tapered surface from the ends of the diametric lines of the tapered surface to the partial circumferential opening, thus weakening the wedge effect. Also, any force that tends to move the fixing tool will result in the end portion of each first engaging piece engaging the tapered surface, thus making the fixing tool even less likely to come off. The inwardly bent end portions thus further reduce the deformation of the first engaging pieces such that the diametrical distance therebetween increases, while more effectively preventing the fixing tool from coming off.

In the second arrangement, one of the cylinder and the spring seat may have an outer diameter smaller than the other of the cylinder and the spring seat: each of the cylinder and the spring seat may have the tapered surface; the fixing tool may further include a reinforcing portion connecting the second engaging pieces together; and the first engaging pieces may be configured to be opposed to the tapered surface of the one of the cylinder and the spring seat, with the second engaging pieces configured to be opposed to the tapered surface of the other of the cylinder and the spring seat.

If there is a difference in outer diameter between the cylinder and the spring seat, the size of the partial circumferential opening defined between the pair of side portions of the fixing tool is determined based on the larger one of the outer diameters of cylinder and the spring seat. This means that there is a larger space between the side portions and one of the cylinder and the spring seat having the smaller outer diameter than between the side portions and the other of the cylinder and the spring seat. Thus, if the engaging pieces opposed to the tapered surface of one of the cylinder and the spring seat having the smaller outer diameter is deformed such that the diametrical distance therebetween increases, the fixing tool is more likely to move. Thus, in order to prevent such deformation of the engaging pieces opposed to the tapered surface of one of the cylinder and the spring seat having the smaller outer diameter, it is preferable to use, in addition to the reinforcing portion, the inwardly bent end portions, while using the reinforcing portion to prevent such deformation of the engaging pieces opposed to the tapered surface of the other of the cylinder and the spring seat.

The fixing tool may be made of steel, aluminum, or a reinforced resin.

Either of the above-described first and second arrangement can reduce the deformation of the engaging pieces of the fixing tool of the auto-tensioner that contact the tapered surface of at least one of the cylinder and the spring seat of the auto-tensioner such that the diametrical distance therebetween increases when sandwiching the spring seat and the cylinder with the engaging pieces from the opposite axial directions, thereby preventing the fixing tool from coming off.

DETAILED DESCRIPTION OF THE INVENTION

Figure 1A:
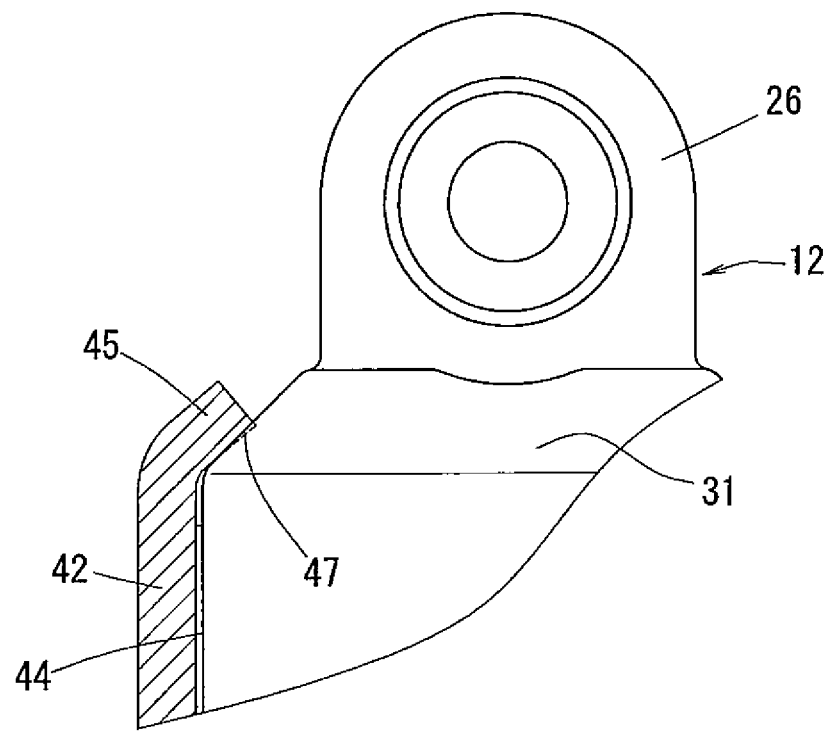
FIG. 1A is a partially vertical sectional front view of an auto-tensioner according to a first embodiment of the present invention, showing a section taken along line Ia-Ia of FIG. 4B.

An auto-tensioner according to a first embodiment of the present invention is now described with reference to FIGS. 1A-7. FIG. 2 illustrates a tension adjusting device for adjusting the tension of an engine accessory driving belt 1 for driving automotive engine accessories. The tension adjusting device includes a pulley arm 4 pivotable about a support shaft 3 fixed to an engine 2, and a tension pulley 5 rotatably mounted on the pulley arm 4. The auto-tensioner 6 according to the first embodiment has one end thereof pivotally coupled through a support shaft 7 to the pulley arm 4, and the other end thereof supported by a support shaft 8 fixed to the engine 2.

Figure 3:
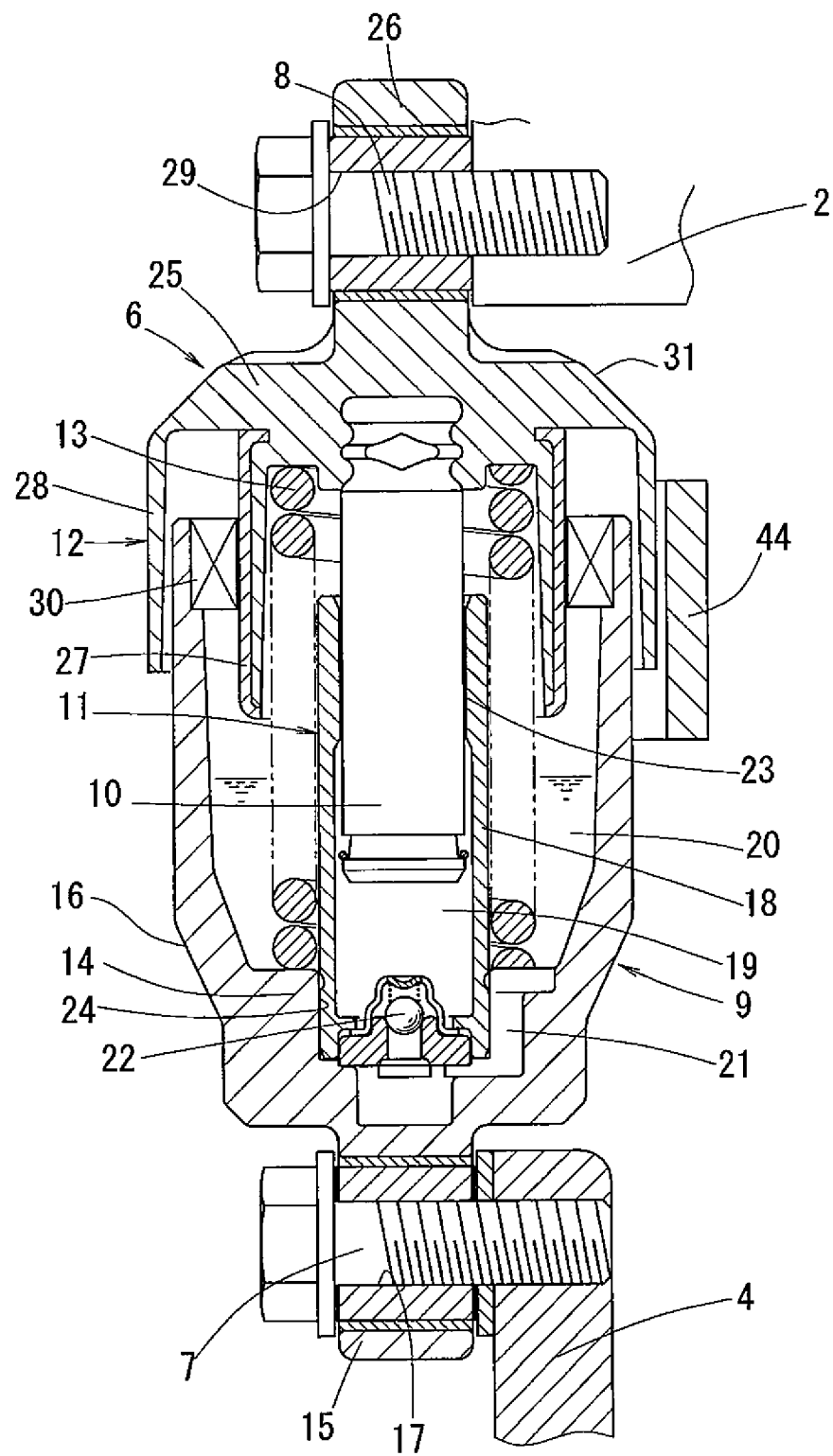
FIG. 3 is a vertical sectional side view of the auto-tensioner shown in FIG. 2.
Figure 4A:
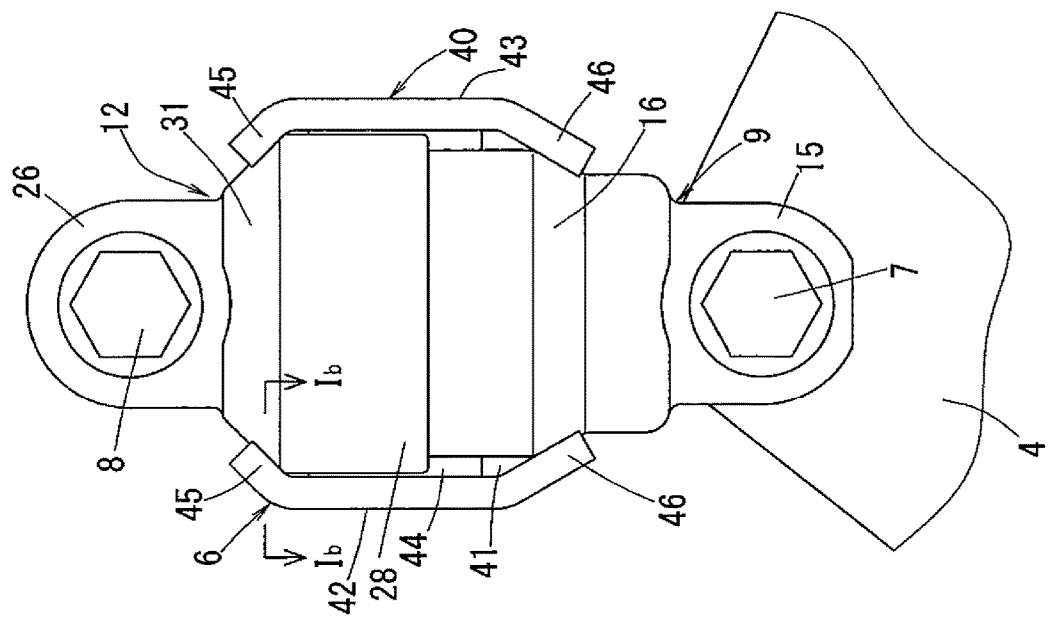
FIG. 4A is a front view of the auto-tensioner shown in FIG. 3.
Figure 4B:
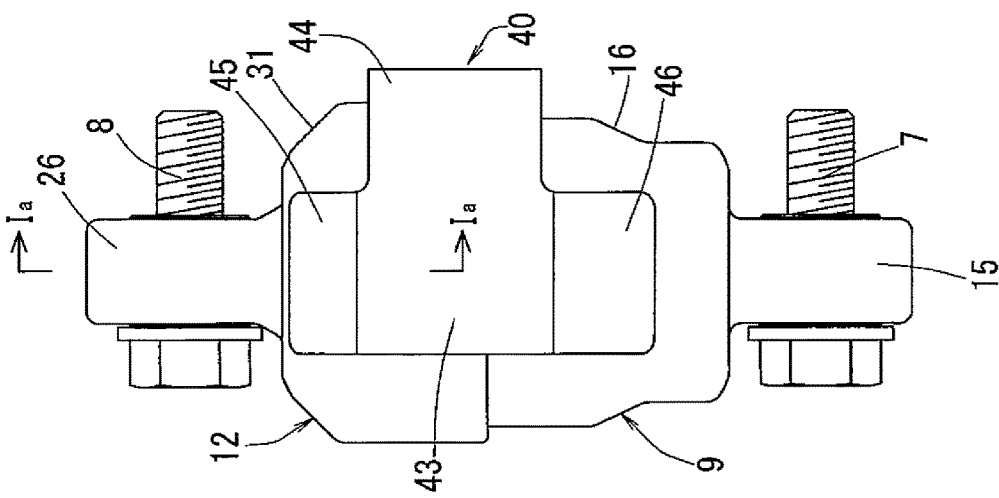
FIG. 4B is a side view of the auto-tensioner shown in FIG. 3.

FIGS. 3, 4A and 4B show the auto-tensioner 6 after the pulley arm 4 and the auto-tensioner 6 have been mounted to the engine 2, and before the engine accessory driving belt 1 is trained around the tension pulley 5 and the like, while assembling the tension adjusting device. As shown, the auto-tensioner 6 includes a cylinder 9; a rod 10 axially movably inserted in the cylinder 9; a hydraulic damper mechanism 11 for dampening a pushing force applied to the rod 10; a spring seat 12 fixed to the end of the rod 10 protruding out of the cylinder 9, and a return spring 13 biasing the rod 10 through the spring seat 12 in the direction in which the rod 10 protrudes out of the cylinder 9.

As used herein, "axial direction", "axial", and "axially" refer to the direction parallel to the common center axis of the cylinder 9, the spring seat 12, and the rod 10. This direction coincides with the vertical direction in FIGS. 3, 4A and 4B. As used herein, "upward direction", "upward", and "upwardly" refer to the axially upward direction, while "downward direction", "downward"; "downwardly" refer to the axially downward direction; "diametrical direction", "diametrical", and "diametrically", refer to a direction perpendicular to the center axis that defines the axial direction; and "circumferential direction", "circumferential", and "circumferentially" refer to the circumferential direction around the center axis.

The cylinder 9 is a tubular member having a closed lower end 14, and an open upper end. The cylinder 9 includes a coupling piece 15 protruding downwardly from the lower end 14, and has a tapered surface 16 whose diameter decreases downwardly, i.e., toward the coupling piece 15. The coupling piece 15 has a through hole 17 through which the support shaft 7 is inserted.

The direction of the center axis of the support shaft 7 inserted through the through hole 17 is hereinafter referred to as the "fore-and-aft directions". Of the fore-and-aft directions, the direction away from the engine 2, shown in FIG. 2, is referred to as the "forward direction". Of the diametrical directions, the direction perpendicular to the fore-and-aft directions is referred to as the "right-and-left direction". The right-and-left direction coincides with the right-and-left direction in FIG. 4A.

As shown in FIG. 3, the cylinder 9 is, in its entirety, an integral one-piece member, and may be formed by cold-forging using aluminum. The cylinder 9 contains air and hydraulic oil in upper and lower layers.

The hydraulic damper mechanism 11 comprises: a sleeve 18 fixed in position in the cylinder 9 so as to be in sliding contact with the outer periphery of the rod 10; a pressure chamber 19 defined in the sleeve 18; a reservoir chamber 20 defined between the sleeve 18 and the cylinder 9; an oil passage 21 through which the bottom of the pressure chamber 19 communicates with the bottom of the reservoir chamber 20; a check valve 22 configured to allow only the flow of hydraulic oil in the oil passage 21 from the reservoir chamber 20 toward the pressure chamber 19; and a leakage gap 23 defined between the sliding surfaces of the sleeve 18 and the rod 10.

The sleeve 18 is inserted in the cylinder 9 so as to be coaxial with the cylinder 9, and the outer periphery of the sleeve 18 is fitted at its lower end portion in a sleeve-fitting recess 24 formed in the inner surface of the lower end 14 of the cylinder 9. The oil passage 21 is defined between the fitting surfaces of the sleeve-fitting recess 24 and the sleeve 18. The check valve 22 is disposed at the end of the oil passage 21 close to the pressure chamber 19.

The tapered surface 16 is a conical surface formed on the outer periphery of a portion of the cylinder 9 which extends from the sleeve-fitting recess 24 to the reservoir chamber 20 and where the diameter of the inner periphery increases upwardly.

The spring seat 12 is made of a synthetic resin such as a phenolic resin. The end portion of the rod 10 protruding out of the cylinder 9 is fixed to the spring seat 12 by insert molding, that is, by forming the spring seat 12 in a mold with the protruding end portion of the rod 10 placed in the mold.

The spring seat 12 comprises: a flange 25 supporting the top end of the return spring 13; a coupling piece 26 protruding upwardly from the flange 25; and tubular inner and outer skirts 27 and 28 extending downwardly from the flange 25.

The coupling piece 26 has a through hole 29 which extends in the fore-and-aft direction and through which the support shaft 8 is inserted. The inner skirt 27 is opposed to the upper inner periphery of the cylinder 9, and is in sliding contact with an annular oil seal 30 mounted to the upper inner periphery of the cylinder 9. The oil seal 30 seals the hydraulic oil in the cylinder 9. The outer skirt 28 is opposed to the upper outer periphery of the cylinder 9, and prevents the oil seal 30 from being exposed to outside.

The spring seat 12 has a tapered surface 31 formed on the outer periphery of the portion of the spring seat 12 connecting the outer skirt 28 to the flange 25. The tapered surface 31 is a conical surface of which the diameter decreases upwardly, i.e., toward the coupling piece 26.

The return spring 13 is a coil spring comprising a helically extending wire, and is mounted between the inner periphery of the cylinder 9 and the outer periphery of the sleeve 18. The bottom end of the return spring 13 is supported by the lower end 14 of the cylinder 9. The top end of the return spring 13 upwardly presses the flange 25 of the spring seat 12, thereby biasing the rod 10 in the direction in which the rod 10 protrudes out of the cylinder 9 (i.e., upward direction). The bottom end of the return spring 13 may be supported by the lower end 14 of the cylinder 9 through a washer.

As shown in FIGS. 3, 4A and 4B, the auto-tensioner 6 further includes a fixing tool 40 configured to be fitted to the outside of the cylinder 9 and the spring seat 12 so as to keep the rod 10 pushed in the cylinder 9. This means that, with the auto-tensioner 6 contracted against the force of the return spring 13 so that the axial length of the auto-tensioner 6 is shorter than when it is in an unstressed state, i.e., when no external force is acting on the auto-tensioner 6, the fixing tool 40 prevents the movement of the rod 10 in the direction in which it protrudes out of the cylinder 9. The fixing tool 40 is configured to keep the rod 10 pushed in the cylinder 9 such that the biasing force of the return spring 13 at that time is about 500 to 1500 N.

Figure 5:
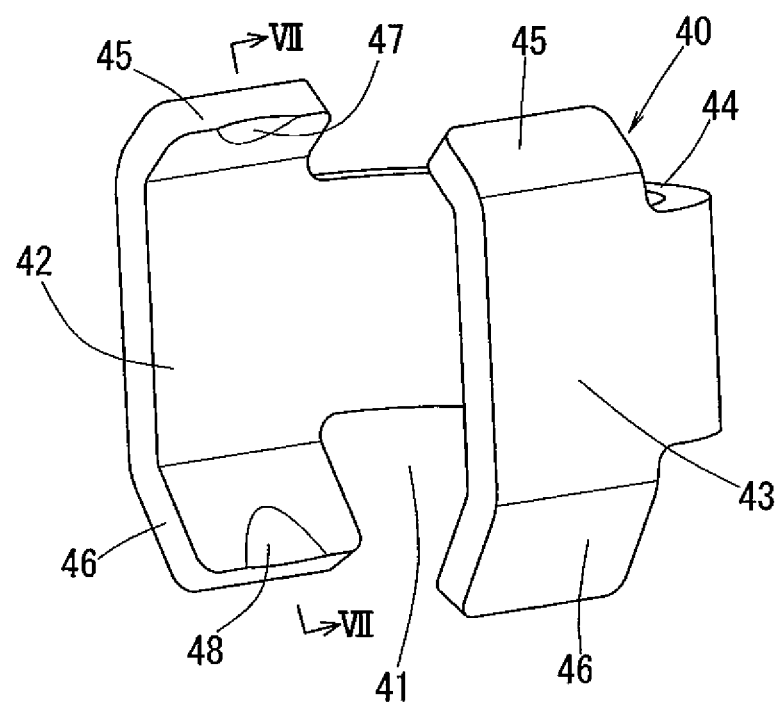
FIG. 5 is a perspective view of a fixing tool of the auto-tensioner of the first embodiment, showing its outer appearance.
Figure 6A:
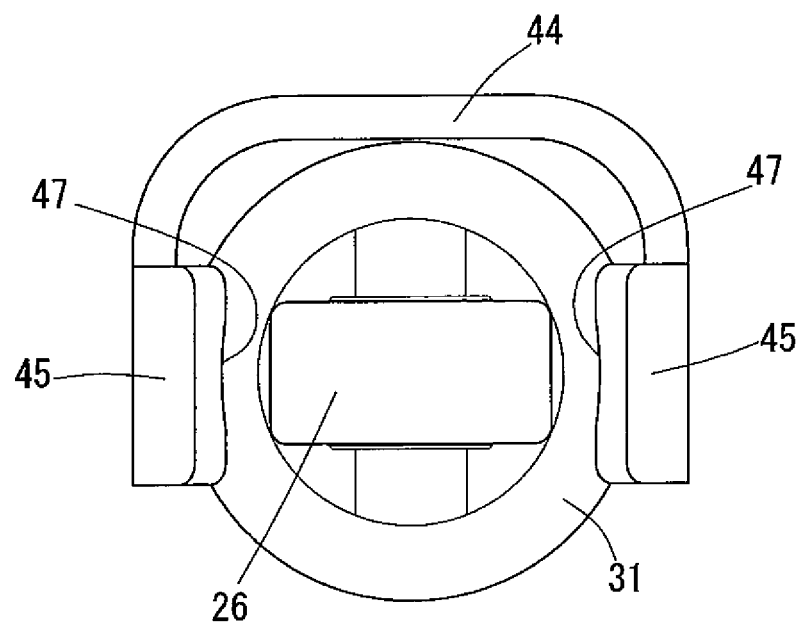
FIG. 6A is a top plan view of the auto-tensioner shown in FIG. 4A.
Figure 6B:
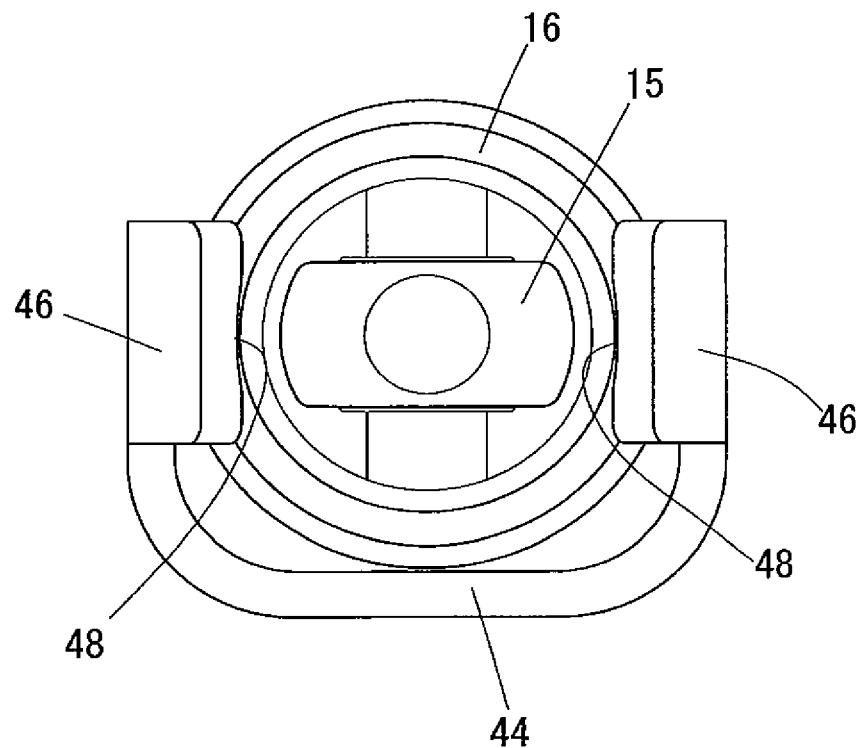
FIG. 6B is a bottom plan view of the auto-tensioner shown in FIG. 4A.

FIG. 5 shows the fixing tool 40 as seen from rightwardly and obliquely upwardly. FIG. 6A shows the bottom surface of the fixing tool 40, while FIG. 6B shows the top surface of the fixing tool 40. As illustrated in these figures, the fixing tool 40 includes a pair of side portions 42 and 43 defining a partial circumferential opening 41 therebetween and arranged so as to sandwich the cylinder 9 and the spring seat 12 from left and right, respectively; and a connecting portion 44 located opposite from the opening 41 and circumferentially connecting the side portions 42 and 43 together. The fixing tool 40 is symmetrical in the right-and-left direction.

The pair of side portions 42 and 43 are plate-shaped portions extending in the fore-and-aft directions, and protruding both upwardly and downwardly beyond the connecting portion 44 (which means that the side portions 42 and 43 are larger in axial length than the connecting portion 44). The connecting portion 44 is disposed upwardly of the tapered surface 16 of the cylinder 9 and downwardly of the tapered surface 31 of the spring seat 12, and extends around the cylinder 9 and the spring seat 12. The front edges of the pair of side portions 42 and 43 are located forwardly of the diametrical lines of the cylinder 9 and the spring seat 12 that extend in the right-and-left direction. The width of the opening 41 in the right-and-left direction is the distance between the front edges of the pair of side portions 42 and 43, and is larger than the spring seat 12. The cylinder 9 and the spring seat 12 are inserted through the opening 41 into the interior space defined by the pair of side portions 42 and 43 and the connecting portion 44.

Each of the (right and left) pair of side portions 42 and 43 includes a pair of engaging pieces 45 and 46 which hold the cylinder 9 and the spring seat 12 from top and bottom, respectively. The upper engaging piece 45 of each side portion 42, 43 is located at the portion of the side portion 42, 43 protruding upwardly beyond the connecting portion 44, and is inclined inwardly such that the entire engaging piece 45 is opposed to the tapered surface 31 of the spring seat 12. The lower engaging piece 46 of each side portion 42, 43 is located at the portion of the side portion 42, 43 protruding downwardly beyond the connecting portion 44, and is inclined inwardly such that the entire engaging piece 46 is opposed to the tapered surface 16 of the cylinder 9.

Figure 7:
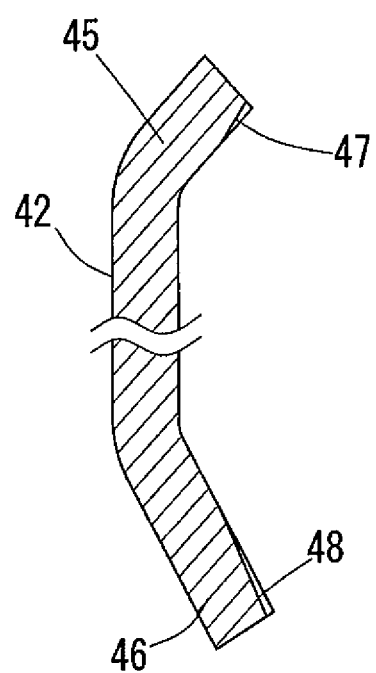
FIG. 7 is a vertical sectional front view taken along line VII-VII of FIG. 5.

FIG. 7 shows a sectional view taken along line VII-VII of FIG. 5. As shown in FIGS. 5-7, the upper engaging piece 45 of each side portion 42, 43 has a concave surface 47 configured to contact the tapered surface 31 of the spring seat 12 over a circumferentially extending area, while the lower engaging piece 46 of each side portion 42, 43 has a concave surface 48 configured to contact the tapered surface 16 of the cylinder 9 over a circumferentially extending area.

Figure 1B:
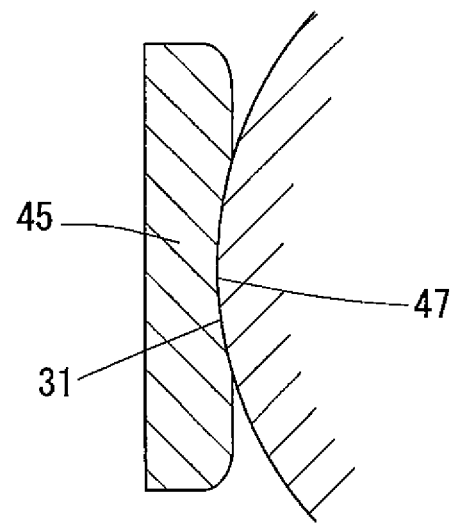
FIG. 1B is a partial cross-sectional view of the auto-tensioner of the first embodiment, showing a section taken along line Ib-Ib of FIG. 4A.
Figure 2:
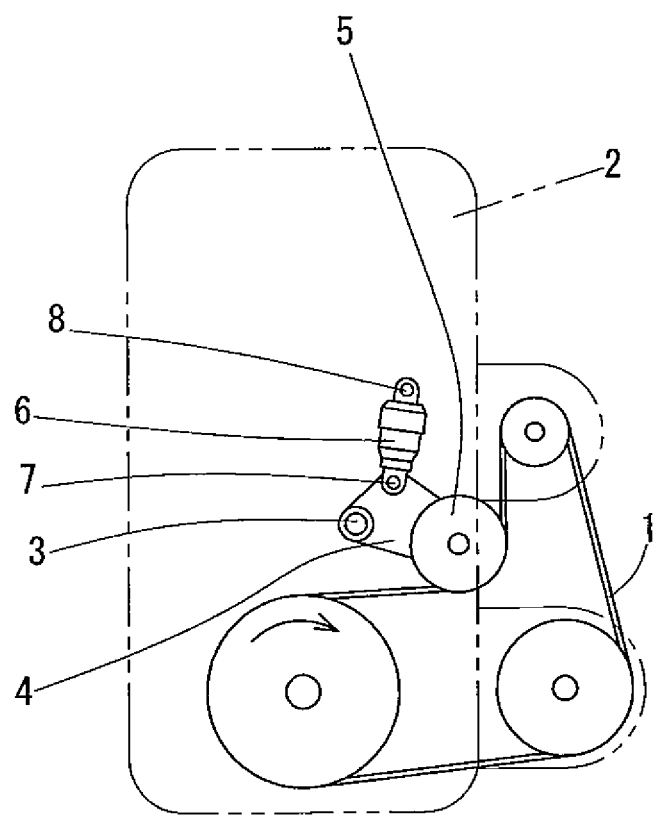
FIG. 2 is a front view of a tension adjusting device in which the auto-tensioner of the first embodiment is used.

FIG. 1A shows a sectional view taken along line Ia-Ia of FIG. 4B, and FIG. 1B shows a sectional view taken along line Ib-Ib of FIG. 4A. As shown in FIGS. 1A, 1B, 5 and 6A, the upper engaging piece 45 of each side portion 42 43 has, on its inner periphery, a flat surface extending in the fore-and-aft direction, and the concave surface 47 is a curved surface recessed from the flat surface. The concave surface 47, comprising a curved surface, is complementary in shape to the (conical) tapered surface 31 of the spring seat 12. In other words, its (circumferential) width and (radial) depth decrease downwardly from the top end of the upper engaging piece 45. The engaging piece 45 is inclined such that only the concave surface 47 thereof contacts the tapered surface 31. The circumferential center of the concave surface 47 is in contact, in the right-and-left direction, with the corresponding ends of the diametrical lines of the tapered surface 31 extending in the right-and-left direction. The circumferential length of the diametrical contact area between the concave surface 47 and the tapered surface 31 is the largest at the top end of the engaging piece 45, and decreases gradually downwardly. There is practically no linear contact area between the concave surface 47 and the tapered surface 31.

The lower engaging piece 46 of each side portion 42, 43, and its concave surface 48 (see FIGS. 5 and 6B) are basically the vertical mirror image of the corresponding upper engaging piece 45 and its concave surface 47, and shaped so as to correspond to the tapered surface 16 of the cylinder 9. That is, while the sectional view of the concave surface 48 is not shown, the concave surface 48 is complementary in shape to the (conical) tapered surface 16 of the cylinder 9. The circumferential center of the concave surface 48 is in contact, in the right-and-left direction, with the corresponding ends of the diametrical lines of the tapered surface 16 extending in the right-and-left direction. The engaging piece 46 is inclined such that only the concave surface 48 thereof contacts the tapered surface 16. The circumferential length of the diametrical contact area between the concave surface 48 and the tapered surface 16 is the largest at the bottom end of the engaging piece 46, and decreases gradually upwardly. There is practically no linear contact area between the concave surface 48 and the tapered surface 16.

If the engaging pieces 45 and 46 shown FIGS. 5, 6A and 6/3 have no concave surfaces 47 and 48, and thus are in contact with the tapered surfaces 16 and 31 only at the flat surfaces extending in the fore-and-aft direction, this means that the engaging pieces 45 and 46 contact the tapered surfaces 16 and 31 only along lines defined by the ends of the diametrical lines of the tapered surfaces 16 and 31 extending in the right-and-left direction, that is, the engaging pieces 45 and 46 are only in line contact with the tapered surfaces 16 and 31. In this case, the spring load concentrates on the linear contact portions, generating large component forces in the right-and-left direction. As a result, due to a wedge effect in which the inclined engaging pieces are strongly pushed only by the component forces in the right-and-left direction, the engaging pieces tend to be deformed such that their inclination angles increase, i.e., the diametrical distances between the respective right and left pairs of engaging pieces increase. Only a slight increase in such diametrical distances tends to result in slippage of the tapered surfaces 16 and 31 relative to the flat surfaces of the engaging pieces, which extend in the fore-and-aft direction, thus making it difficult to stably maintain the position of the fixing tool. This means that, if there are no concave surfaces 47 and 48, the larger the spring load is, the more likely the fixing tool is to come off the cylinder 9 and the spring seat 12, i.e., the more difficult it is to rigidly hold the cylinder 9 and the spring seat 12 from axially both sides.

In contrast, if the inclined engaging pieces 45 and 46 have concave surfaces 47 and 48 configured to contact the tapered surfaces 16 and 31 over circumferentially extending areas (as shown in FIGS. 1A and 1B), the spring load of the return spring 13 (shown in FIG. 3) will push each engaging piece 45, 46 (shown in FIG. 4A), not in substantially the right-and-left direction only, but in different diametrical directions. This weakens the wedge effect, so that the diametrical distances between the respective opposed pairs of engaging pieces 45 and 46 do not increase considerably, making the fixing tool 40 less likely to come off the cylinder 9 and the spring seat 12. Also, any force that tends to move the fixing tool 40 relative to the cylinder 9 and the spring seat 12 will result in the concave surface 47, 48 of each engaging piece 45, 46 engaging, in the fore-and-aft direction, one of the right and left ends of the portion of the tapered surface 16, 31 that is located inside of the concave surface 47, 48, thus making the fixing tool 40 even less likely to come off the cylinder 9 and the spring seat 12.

The fixing tool 40 may be made of e.g., steel material, aluminum or reinforced resin. If steel material is used for the fixing tool 40, the entire fixing tool 40 may be formed by pressing to the final shape. If aluminum or reinforced resin is used for the fixing tool 40, the entire fixing tool 40 may be formed by molding to the final shape. As used herein, steel material refers to a material comprising steel; aluminum may be either pure aluminum or an aluminum alloy; and reinforced resin refers to a fiber-reinforced plastic (FRP).

The auto-tensioner 6 may be, for example, mounted to the engine 2 as follows. First, as shown in FIGS. 3, 4A, 4B, 6A and 6B, the fixed member 40 is attached to the cylinder 9 and the spring seat 12 to keep the auto-tensioner 6 contracted, and as shown in FIG. 2, the tension pulley 5 is mounted to the pulley arm 4. Then, the lower coupling piece 15 (shown in FIGS. 3, 4A and 6B) of the auto-tensioner 6 is coupled to the pulley arm 4 through the support shaft 7. Next, as shown in FIG. 2, the upper coupling piece 26 (shown in FIGS. 3, 4A and 6A) of the auto-tensioner 6 and the pulley arm 4 are mounted to the engine 2 through the respective support shafts 8 and 3. In this state, the engine accessory driving belt 1 is trained around pulleys (not shown) for driving respective engine accessories and the tension pulley 5. At this stage, since the auto-tensioner 6 is kept contracted, no tension is being applied to the engine accessory driving belt 1. In this state, the fixing tool 40 is removed from the cylinder 9 and the spring seat 12 by further contracting the auto-tensioner 6. Once the fixing tool 40 is removed, the rod 10 protrudes out of the cylinder 9, that is, the auto-tensioner 6 expands, thereby applying tension to the engine accessory driving belt 1.

Now referring to FIGS. 2 and 3, description is made of how the auto-tensioner 6 operates. When, during operation of the engine 2, the tension of the engine accessory driving belt 1 decreases, the rod 10 protrudes out of the cylinder 9 until the tension of the engine accessory driving belt 1 and the biasing force of the return spring 13 balance with each other, thereby removing slack of the engine accessory driving belt 1. During this phase, the pressure in the pressure chamber 19 falls, and the check valve 22 opens, allowing hydraulic oil in the reservoir chamber 20 to flow into the pressure chamber 19 through the oil passage 21, so that the rod 10 moves quickly.

When, during operation of the engine 2, the tension of the engine accessory driving belt 1 increases, the rod 10 is pushed into the cylinder 9 until the tension of the engine accessory driving belt 1 and the biasing force of the return spring 13 balance with each other, thus reducing the tension of the engine accessory driving belt 1. During this phase, the pressure in the pressure chamber 19 increases, closing the check valve 22. This causes hydraulic oil in the pressure chamber 19 to leak out into the reservoir chamber 20 through the leakage gap 23. The viscous resistance of hydraulic oil flowing through the leakage gap 23 produces a damper force that causes the rod 10 to move slowly.

In the first embodiment, as described above, since the concave surfaces 47 and 48 of the inclined engaging pieces 45 and 46, which are opposed to the tapered surfaces 16 and 31, are configured to contact the tapered surfaces 16 and 31 over circumferentially extending areas (as shown in FIGS. 1A, 1B, 6A and 6B), the wedge effect is weak, so that the diametrical distances between the respective opposed pairs of engaging pieces 45 and 46 do not increase considerably, making the fixing tool 40 less likely to come off the cylinder 9 and the spring seat 12. Also, any force that tends to move the fixing tool 40 in the fore-and-aft direction relative to the cylinder 9 and the spring seat 12 will result in the concave surface 47, 48 of each engaging piece 45, 46 engaging, in the fore-and-aft direction, one of the right and left ends of the portion of the tapered surface 16, 31 that is located inside of the concave surface 47, 48, thus making the fixing tool 40 even less likely to come off the cylinder 9 and the spring seat 12. Since the auto-tensioner 6 is configured such that the diametrical distances between the engaging pieces 46 and between the engaging pieces 45 do not increase considerably when they contact the respective tapered surfaces 16 and 31, it is possible to prevent the fixing tool 40 from disengaging from the cylinder 9 and the spring seat 12, so that the fixing tool 40 can rigidly keep the auto-tensioner 6 in a contracted state.

Figure 8:
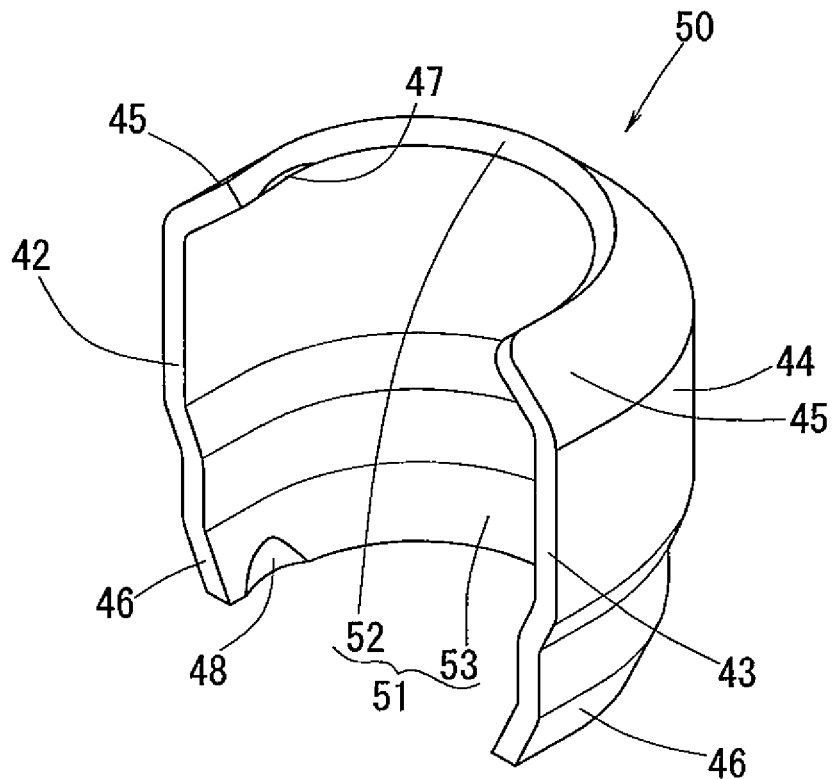
FIG. 8 is a perspective view of a fixing tool according to a second embodiment of the present invention, showing its outer appearance.

The second embodiment of the present invention is described with reference to FIG. 8. The description of the second embodiment is limited to what differs from the first embodiment. As shown in FIG. 8, the fixing tool 50 of the second embodiment additionally includes reinforcing portions 51 which comprises an upper reinforcing portion 52 that connects together the inclined, upper (i.e., located closer to the spring seat) engaging pieces 45 of the respective two side portions 42 and 43, and a lower reinforcing portion 53 that connects together the inclined, lower (i.e., located closer to the cylinder) engaging pieces 46 of the respective two side portions 42 and 43. The upper reinforcing portion 52 is integrally connected to the top of the connecting portion 44, and is disposed between and integrally connected to the upper engaging pieces 45 so as to have the same height and inclination angle as the engaging pieces 45. The lower reinforcing portion 53 is integrally connected to the bottom of the connecting portion 44, and is disposed between and integrally connected to the lower engaging pieces 46 so as to have the same height and inclination angle as the engaging pieces 46. The portions of the side portions 42 and 43 located forwardly of the circumferential centers of the respective concave surfaces 47 and 48 are plate-shaped portions extending in the fore-and-aft direction, and the portions of the side portions 42 and 43 other than the plate-shaped portions, the connecting portion 44, and the reinforcing portions 51 form a semicircle.

The upper reinforcing portion 52 resists the wedge effect on the upper engaging pieces 45, thereby preventing the engaging pieces 45 from being deformed such that the diametrical distance therebetween increases. The lower reinforcing portion 53 resists the wedge effect on the lower engaging pieces 46, thereby preventing the engaging pieces 46 from being deformed such that the diametrical distance therebetween increases. The arrangement of the second embodiment is therefore more effective than the first embodiment in preventing the engaging pieces 45 and 46 from being deformed such that the diametrical distances therebetween increase.

Figure 9A:
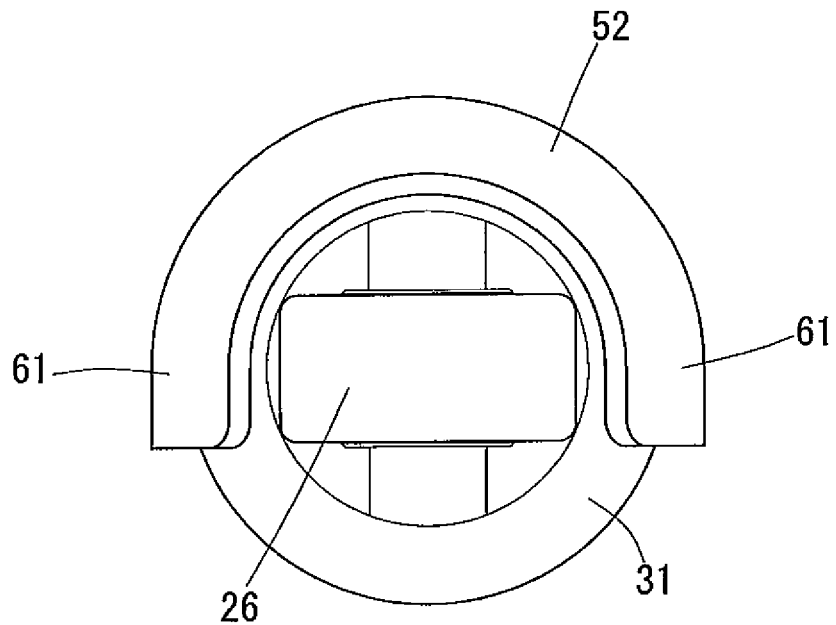
FIG. 9A is a top plan view of an auto-tensioner according to a third embodiment of the present invention.
Figure 9B:
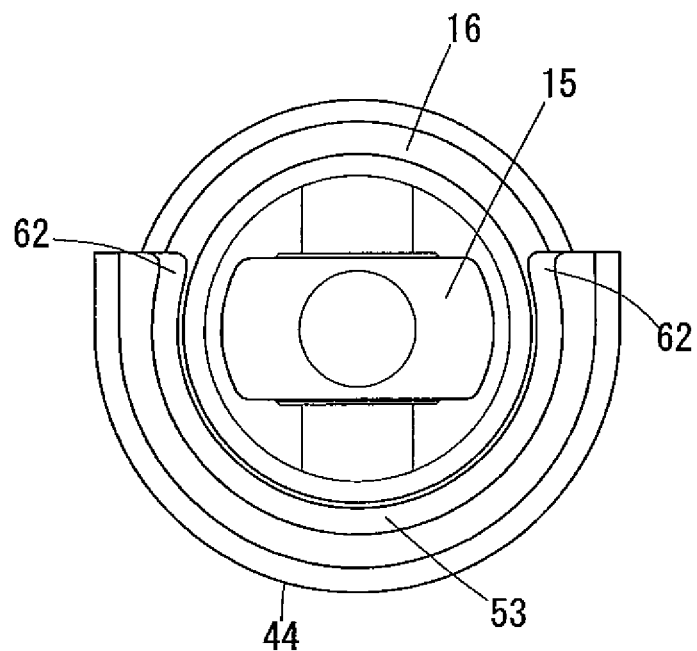
FIG. 9B is a bottom plan view of the auto-tensioner of the third embodiment.
Figure 10:
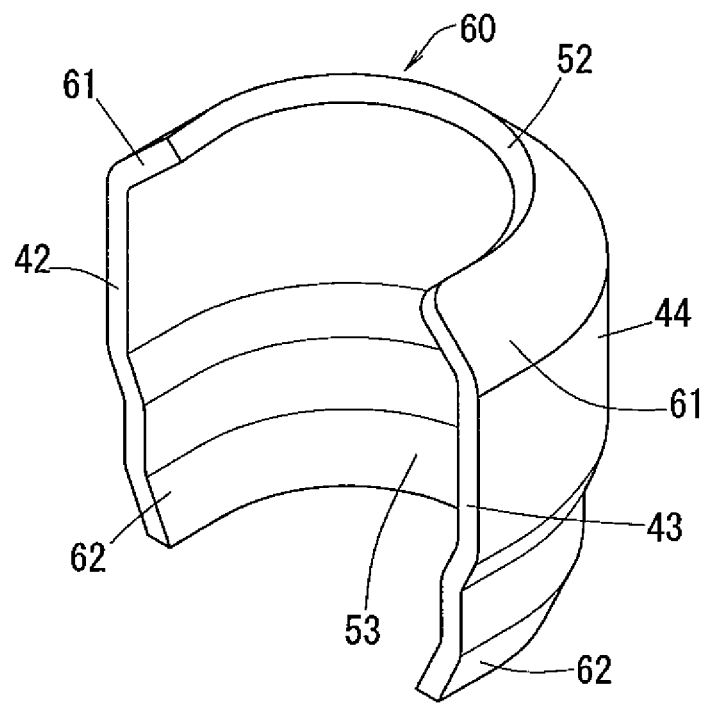
FIG. 10 is a perspective view of a fixing tool of the third embodiment, showing its outer appearance.

The auto-tensioner according to the third embodiment of the present invention is described with reference to FIGS. 9A-10. As will be apparent from these figures, the fixing tool 60 of the third embodiment differs from that of the second embodiment only in that none of the upper and lower engaging pieces 61 and 62 has a concave surface. In the third embodiment, as with the second embodiment, the upper and lower reinforcing portions 52 and 53 prevent the engaging pieces 61 and 62 from being deformed such that the diametrical distances therebetween increase. Although the arrangement of the third embodiment cannot prevent such deformation as effectively as the arrangement of the second embodiment, the fixing tool 60 of the third embodiment can be manufactured more easily because it has no concave surfaces. As an alternative, the fixing tool may be configured such that at least one of the upper and lower reinforcing portions 52 and 53 contacts the corresponding tapered surface 16, 31 to receive the spring load from the return spring at this contact portion.

The auto-tensioner according to the fourth embodiment of the present invention is described with reference to FIGS. 11-14.

Figure 11:
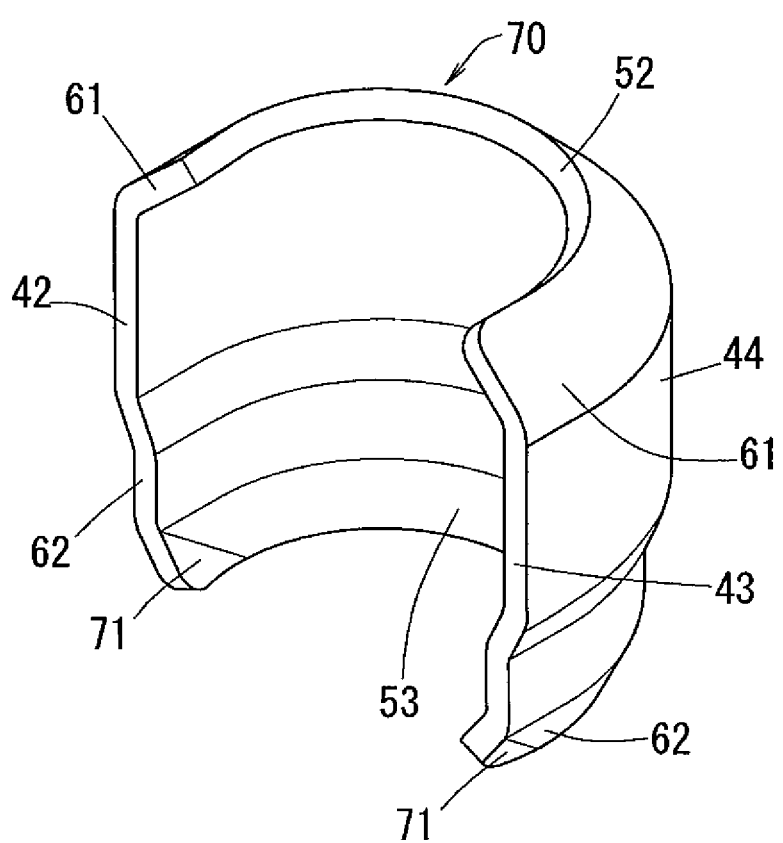
FIG. 11 is a perspective view of a fixing tool according to a fourth embodiment of the present invention, showing its outer appearance.
Figure 12A:
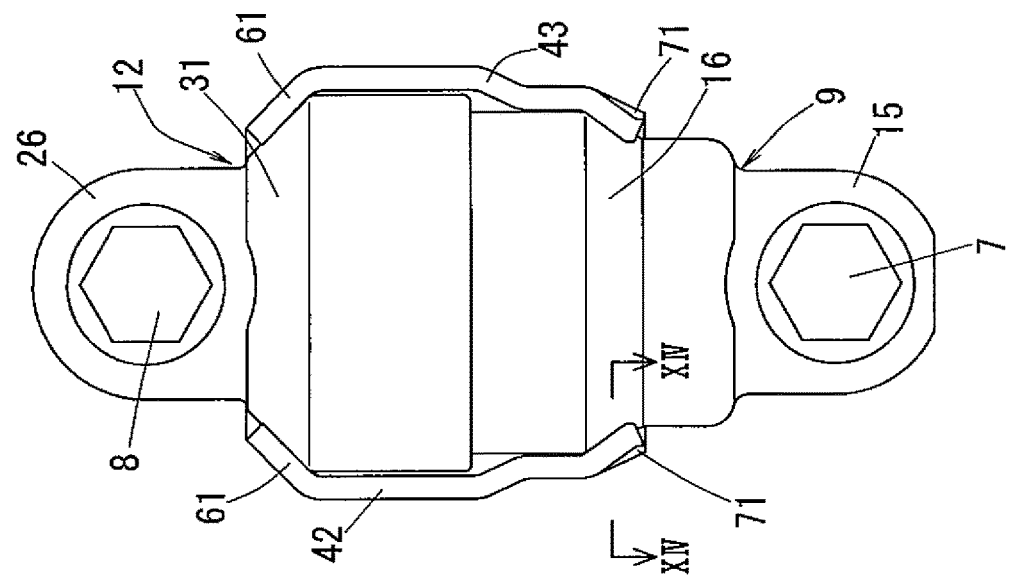
FIG. 12A is a front view of an auto-tensioner of the fourth embodiment.
Figure 12B:
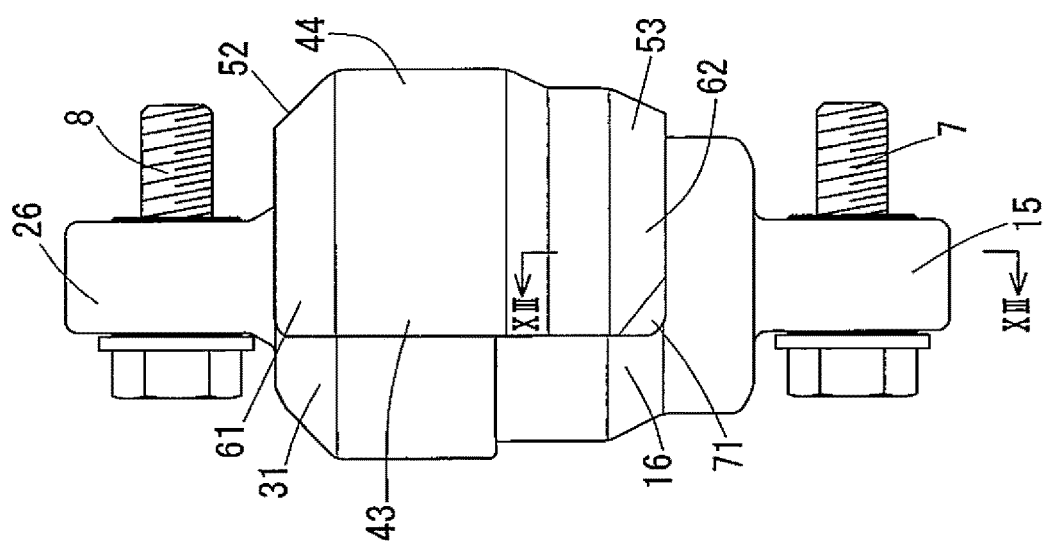
FIG. 12B is a side view of the auto-tensioner of the fourth embodiment.

As shown in FIGS. 11, 12A and 12B, the fixing tool 70 of the fourth embodiment differs from that of the third embodiment only in that lower engaging pieces 62 are different in shape from the lower engaging pieces of the third embodiment. In particular, the lower engaging pieces 62 are bent inwardly at front end portions 71 (facing the opening). The front end portions 71 of the respective lower engaging pieces 62 are located forwardly of the respective ends of the diametrical lines of the tapered surface 16 extending in the right-and-left direction, and are bent inwardly.

Figure 13:
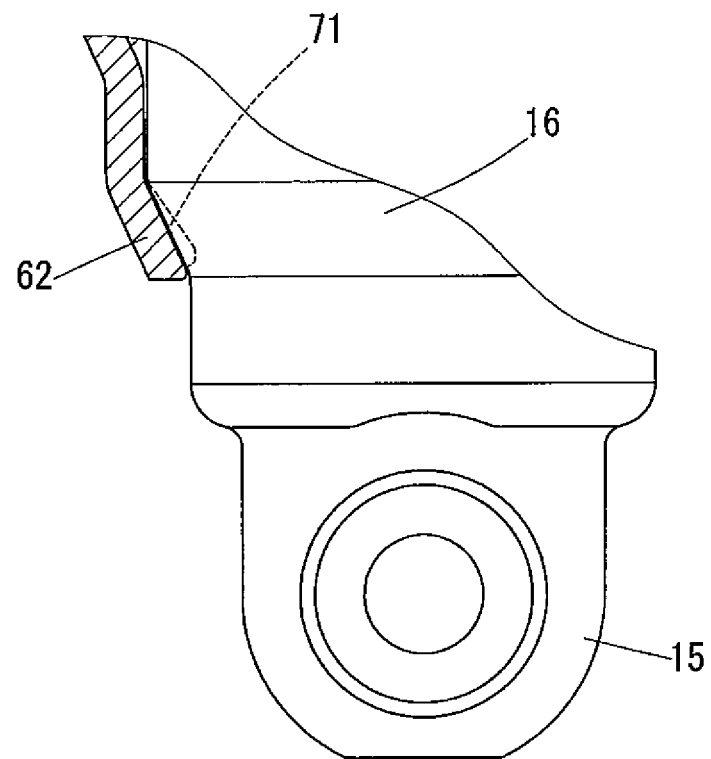
FIG. 13 is a partially vertically sectional front view of the auto-tensioner of the fourth embodiment, showing a section taken along line XIII-XIII of FIG. 12B.
Figure 14:
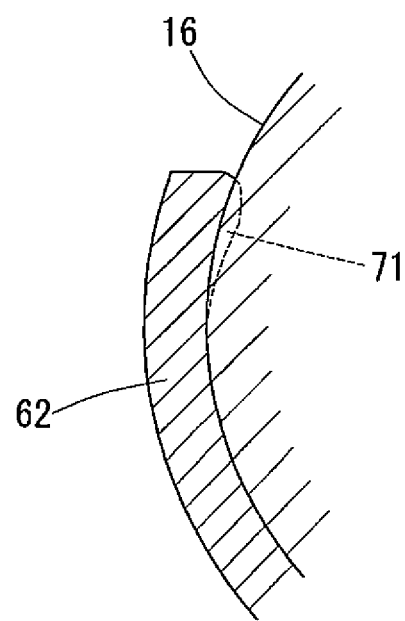
FIG. 14 is a partial cross-sectional view taken along line XIV-XIV of FIG. 12A.

FIG. 13 shows a section taken along line XIII-XIII of FIG. 12B, while FIG. 14 shows a section taken along line XIV-XIV of FIG. 12A. As shown in FIGS. 11, 13 and 14, the front end portions 71 of the respective lower engaging pieces 62 are curved so as to extend along the areas of the tapered surface 16 located forwardly of the respective ends of the diametrical lines of the tapered surface 16. Thus, each engaging piece 62 contacts the tapered surface 16 at a plurality of circumferentially spaced apart portions or a circumferentially continuous portion in the area of the tapered surface. 16 located forwardly of the corresponding ends of the diametric lines of the tapered surface 16 extending in the right-and-left direction. As a result, the spring load from the return spring will push each engaging piece 62 (shown in FIG. 12A), not in substantially the right-and-left direction only, but in different diametrical directions. This weakens the wedge effect on the engaging piece 62. Also, any force that tends to move the fixing tool 70 in the fore-and-aft direction will result in the front end portion 71 of each engaging piece 62 engaging the tapered surface 16, thus making the fixing tool 70 even less likely to come off the cylinder 9 and the spring seat 12. Thus, compared to the third embodiment, the engaging pieces 62 of the fixing tool of the fourth embodiment, which contact the tapered surface 16, are less likely to be deformed such that their diametrical distance therebetween increase, so that the fixing tool of the fourth embodiment is less likely to come off.

In the fourth embodiment, since the engaging pieces 62 (i.e., the engaging pieces that are opposed to the tapered surface of one of the cylinder 9 and the spring seat 12 having the smaller outer diameter, i.e., the tapered surface 16 of the cylinder 9) have the front end portions 71, in addition to the lower reinforcing portion 53, the inwardly bent front end portions 71 serve as extra means for preventing the engaging pieces 62 from being deformed such that the diametrical distance therebetween increases, while the upper reinforcing portion 52 prevents such deformation of the engaging pieces 61, which are opposed to the tapered surface of the other of the cylinder 9 and the spring seat 12, which have the larger outer diameter, i.e., the tapered surface 31 of the spring seat 12. As described earlier, if the engaging pieces 62 are deformed such that the diametrical distance therebetween increases, the fixing tool 70 is more likely to move. The front end portions 71 serve to additionally prevent such deformation of the engaging pieces 62.

The embodiments disclosed above are examples only in every respect, and should not be understood to restrict the present invention. For example, each one, only at least one of the upper or lower ones, or at least one of the right or left ones, of the engaging pieces may include the concave surface or the inwardly bent front end portion, or the reinforcing portion may be disposed between each, or only one, of the respective upper and lower pairs of engaging pieces. Also, the cylinder may have an outer diameter larger than the spring seat. The present invention is defined by the appended claims, and encompasses all of the modifications that are considered to be within the scope of the claims both literally and equivalently.

DESCRIPTION OF THE REFERENCE NUMERALS

6. Auto-tensioner
9. Cylinder
10. Rod
11. Hydraulic damper mechanism
12. Spring seat
13. Return spring
14. Lower end
15, 26. Coupling piece
16, 31. Tapered surface
25. Flange
40, 50, 60, 70. Fixing tool
41. Opening
42, 43. Side portion
44. Connecting portion
45, 46, 61, 62. Engaging piece
47, 48. Concave surface
51. Reinforcing portions
52, 53. Reinforcing portion
71. Front end portion

What is claimed is:

1. An auto-tensioner comprising:
a cylinder having a closed end;
a rod axially movably inserted in the cylinder and having a protruding end protruding beyond the cylinder;
a hydraulic damper mechanism configured to dampen a pushing force applied to the rod;
a spring seat fixed to the protruding end of the rod;
a return spring configured to bias, through the spring seat, the rod in a direction in which the rod protrudes out of the cylinder; and
a fixing tool configured to be fitted to outside of the cylinder and the spring seat so as to keep the rod pushed into the cylinder,
wherein the spring seat includes a flange supporting the return spring, and a coupling piece axially protruding from the flange,
wherein the cylinder includes a coupling piece axially protruding from the closed end of the cylinder, and
wherein at least one of the spring seat and the cylinder has a tapered surface having a diameter which decreases axially toward the coupling piece of the at least one of the spring seat and the cylinder;
wherein the fixing tool includes:
a pair of side portions defining a partial circumferential opening therebetween, and arranged so as to sandwich the cylinder and the spring seat in a diametrical direction;
a connecting portion circumferentially connecting the pair of side portions together at a position opposite from the partial circumferential opening;
wherein each of the pair of side portions includes a first engaging piece and a second engaging piece that are configured to sandwich the cylinder and the spring seat from axially opposite directions with the first engaging piece opposed to the tapered surface, the first engaging piece being inclined inwardly; and
a reinforcing portion connecting together the respective first engaging pieces of the pair of side portions.

2. The auto-tensioner of claim 1, wherein the first engaging piece of each of the pair of side portions includes an inwardly bent end portion located close to the partial circumferential opening, and configured to contact the tapered surface.

3. The auto-tensioner of claim 2, wherein:
one of the cylinder and the spring seat has an outer diameter smaller than the other of the cylinder and the spring seat;
each of the cylinder and the spring seat has the tapered surface;
the fixing tool further includes a reinforcing portion connecting the second engaging pieces together; and the respective first engaging pieces of the pair of side portions are configured to be opposed to the tapered surface of the one of the cylinder and the spring seat, and the respective second engaging pieces of the pair of side portions are configured to be opposed to the tapered surface of the other of the cylinder and the spring seat.

4. The auto-tensioner of claim 1, wherein the fixing tool is made of one of steel, aluminum and a reinforced resin.

\* \* \* \* \*